US012675365B2

(12) United States Patent
Del Gatto et al.

(10) Patent No.: US 12,675,365 B2
(45) Date of Patent: Jul. 7, 2026

(54) INTERNAL MEMORY ERROR CORRECTION CODE INFORMATION FOR MEMORY SYSTEMS

(71) Applicant: Micron Technology, Inc., Boise, ID (US)

(72) Inventors: Nicola Del Gatto, Cassina de' Pecchi (IT); Marco Sforzin, Cernusco Sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/783,196

(22) Filed: Jul. 24, 2024

(65) Prior Publication Data

US 2026/0030104 A1 Jan. 29, 2026

(51) Int. Cl.
*G06F 11/10* (2006.01)
(52) U.S. Cl.
CPC ...... *G06F 11/1076* (2013.01); *G06F 11/1004* (2013.01)
(58) Field of Classification Search
CPC .......................... G06F 11/1076; G06F 11/1004
See application file for complete search history.

(56) References Cited

U.S. PATENT DOCUMENTS

2022/0237077 A1*  7/2022  Brewer ............... G06F 11/1048
2024/0086090 A1*  3/2024  Lu ........................ G06F 3/0614

* cited by examiner

*Primary Examiner* — Bryce P Bonzo
*Assistant Examiner* — Audrey Emma Whitesell
(74) *Attorney, Agent, or Firm* — Harrity & Harrity, LLP

(57) ABSTRACT

In some implementations, a memory system may retrieve, via a first access operation, a block of user data that is stored in a first portion of a memory associated with one or more data pins, wherein internal memory error correction code (ECC) information associated with the block of user data is stored in a second portion of the memory associated with one or more data mask inversion (DMI) pins, and wherein data transfer via the one or more DMI pins is disabled to enable masked write commands. The memory system may retrieve, via a second access operation, cyclic redundancy check (CRC) information that is stored in a third portion of the memory associated with the one or more data pins. The memory system may determine, using the block of user data and the CRC information, whether the block of user data includes one or more bit errors.

25 Claims, 6 Drawing Sheets

500

510 ⟶ Retrieve, via a first access operation, a block of user data, wherein the block of user data is stored in a first portion of a memory associated with one or more data pins and is retrieved, during the first access operation, using the one or more data pins, wherein internal memory ECC information associated with the block of user data is stored in a second portion of the memory associated with one or more DMI pins, and wherein data transfer via the one or more DMI pins is disabled to enable masked write commands using the one or more DMI pins 520 ⟶ Retrieve, via a second access operation, CRC information associated with the block of user data, wherein the CRC information is stored in a third portion of the memory associated with the one or more data pins and is retrieved, during the second access operation, using the one or more data pins 530 ⟶ Determine, using the block of user data and the CRC information, whether the block of user data includes one or more bit errors

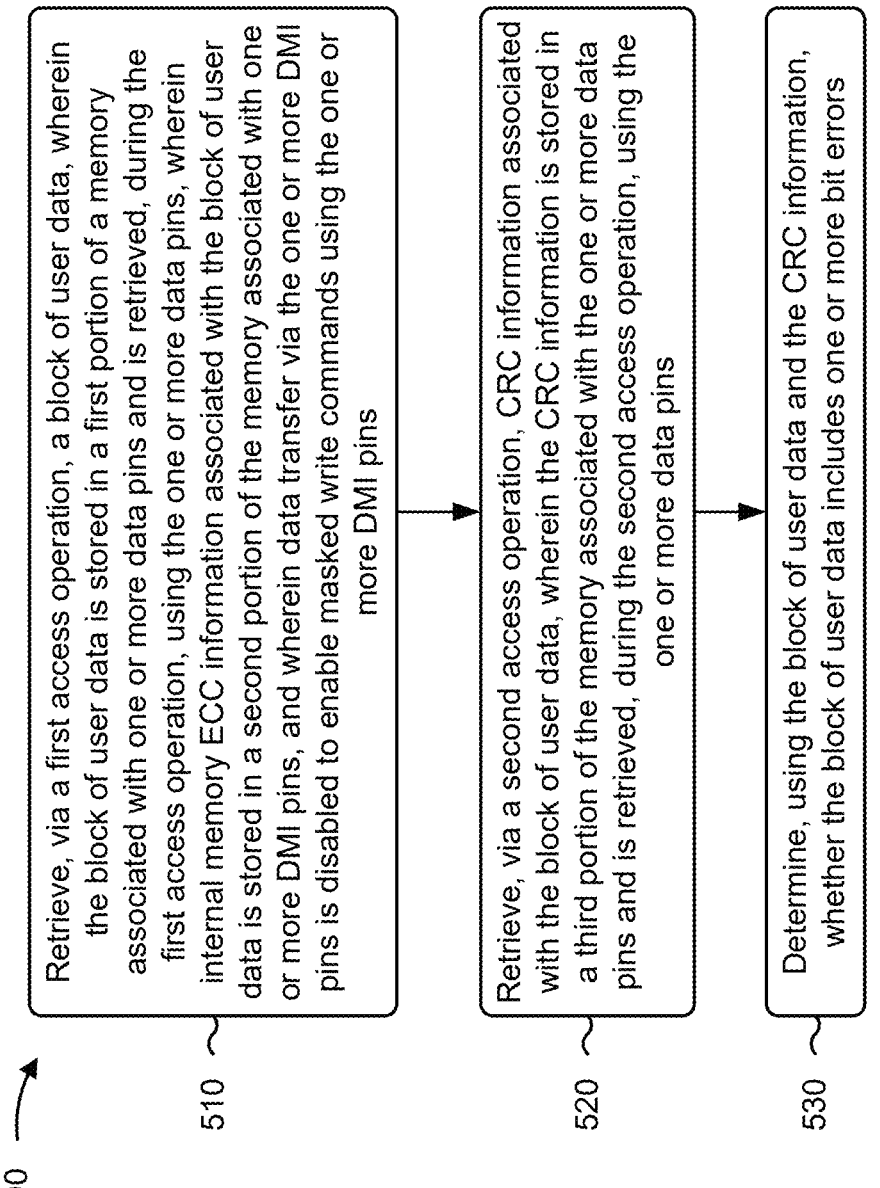

500

510 — Retrieve, via a first access operation, a block of user data, wherein the block of user data is stored in a first portion of a memory associated with one or more data pins and is retrieved, during the first access operation, using the one or more data pins, wherein internal memory ECC information associated with the block of user data is stored in a second portion of the memory associated with one or more DMI pins, and wherein data transfer via the one or more DMI pins is disabled to enable masked write commands using the one or more DMI pins 520 — Retrieve, via a second access operation, CRC information associated with the block of user data, wherein the CRC information is stored in a third portion of the memory associated with the one or more data pins and is retrieved, during the second access operation, using the one or more data pins 530 — Determine, using the block of user data and the CRC information, whether the block of user data includes one or more bit errors

FIG. 5

INTERNAL MEMORY ERROR CORRECTION CODE INFORMATION FOR MEMORY SYSTEMS

TECHNICAL FIELD

The present disclosure generally relates to memory devices, memory device operations, and, for example, to internal memory error correction code information for memory systems.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, or 1.5, among other examples). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

Techniques such as the redundant array of independent disks (RAID) have been utilized to enhance data reliability in storage systems, including those involving volatile memory devices like DRAM. RAID configurations can protect data through data striping, mirroring, and parity. Data is distributed across multiple disks, with extra information stored to enable the reconstruction of lost data. RAID techniques have also been applied within memory modules to support high reliability in applications such as enterprise-level computing and automotive systems.

BRIEF DESCRIPTION OF THE DRAWINGS

FIG. 5 is a flowchart of an example method associated with internal memory ECC information for memory systems.

DETAILED DESCRIPTION

Figure 1:
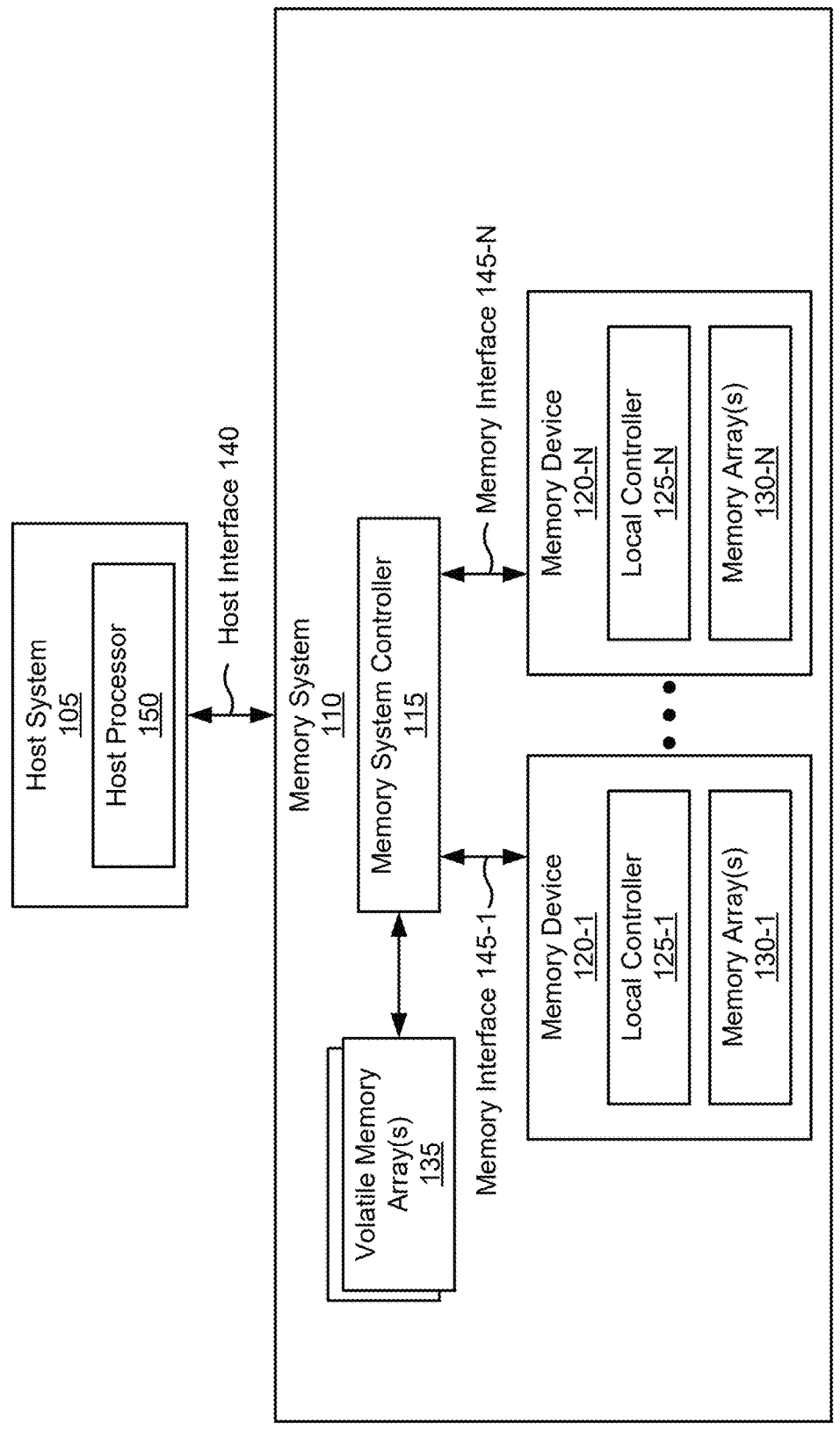
FIG. 1 is a diagram illustrating an example system capable of implementing internal memory error correction codes (ECCs) in RAID-based memory systems.

In certain computational systems, DRAM plays a crucial role in facilitating rapid data access and processing. RAID technologies have been incorporated into DRAM-based memory systems to enhance fault tolerance, such as by providing mechanisms to recover from faults caused by a cluster of bit errors and/or an entire die failure. These RAID implementations customarily involve complex interactions between memory controller ECC mechanisms, cyclic redundancy check (CRC) bit usage for error identification, and metadata bit management, all coordinated across multiple user data blocks (UDBs) and one or more parity data blocks (PDBs) that define a RAID codeword and/or a RAID stripe.

The conventional processes for implementing RAID error correction operations in DRAM may involve disabling an on-die ECC, requiring the use of additional memory controller components. In this regard, although RAID error correction operations may improve memory system resiliency and fault tolerance, such operations increase computational complexity and/or may consume critical SRAM storage and/or application specific integrated circuit (ASIC) area (e.g., in the context of a compute express link (CXL) compliant memory system, among other examples). Furthermore, when errors occur, the activation of RAID recovery flows impacts bandwidth and processing speed within a memory system.

In some examples, a RAID architecture may rely on storing information in a portion of memory accessible via one or more data mask inversion (DMI) pins (sometimes referred to herein as a direct link ECC protocol (DLEP) area). In such architectures, certain commands, such as masked write or similar commands, may not be capable of being utilized due to the repurposing of DMI pins for data transfer. Additionally, or alternatively, because each RAID operation requires multiple individual data transactions (e.g., reads and writes of multiple UDBs and/or PDBs) that must be executed with precision, high memory and controller resources may be dedicated to error management tasks. Accordingly, certain RAID-based memory systems may result in inefficient use of memory controller real estate, excessive data redundancy mechanisms, and/or high resource consumption.

Some techniques described herein enhance RAID-based memory systems by enabling masked write operations and/or by incorporating the use of internal memory ECC operations (e.g., on-die ECC operations). In some implementations, a memory system may be capable of retrieving a block of user data via data pins (e.g., DQ pins) while disabling data transfer using DMI pins that may be traditionally used in some RAID-based systems for conveying ECC information, thereby enabling masked write commands via the DMI pins. As a result, the memory system may perform more efficient data accesses (e.g., masked write operations) while eliminating a need for external ECC components at a memory controller (e.g., a CXL ASIC, among other examples). Moreover, CRC information may be stored and accessed independently using the data pins, separate from the block of user data. In this way, the memory system may enable masked write commands to update CRC information in memory while employing an internal memory ECC component for correcting a broader range of errors than an external ECC component, thereby improving data integrity and reliability. Moreover, by eliminating the need for external ECC components, the memory system may enable a streamlined ASIC area and/or a simplified memory controller architecture. The efficiency of the system is augmented by the diminished reliance on SRAM for temporary data storage during write operations, enabled by the use of masked write operations. Furthermore, by integrating internal memory ECC operations, the memory system may provide enhanced error pattern coverage, which may decrease the frequency of engaging resource-intensive RAID recovery protocols. This effective error management leads to an optimized balance of bandwidth and latency, contributing to increased system resilience and efficiency with heightened error coverage capabilities. Consequently, the improved memory system may conserve processing resources, reduce overhead, and minimize the performance impact typically associated with RAID recovery processes, providing a robust and fast memory solution with reduced resource consumption.

FIG. 1 is a diagram illustrating an example system 100 capable of implementing internal memory ECCs in RAID-based memory systems. The system 100 may include one or more devices, apparatuses, and/or components for perform-ing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respec-tive memory interfaces 145, shown as memory interfaces 145-1 through 145-N (where N≥1).

The system 100 may be any electronic device configured to store data in memory. For example, the system 100 may be a computer, a mobile phone, a wired or wireless com-munication device, a network device, a server, a device in a data center, a device in a cloud computing environment, a vehicle (e.g., an automobile or an airplane), and/or an Internet of Things (IoT) device. The host system 105 may include a host processor 150. The host processor 150 may include one or more processors configured to execute instructions and store data in the memory system 110. For example, the host processor 150 may include a central processing unit (CPU), a graphics processing unit (GPU), a field-programmable gate array (FPGA), an application-spe-cific integrated circuit (ASIC), and/or another type of pro-cessing component.

The memory system 110 may be any electronic device or apparatus configured to store data in memory. For example, the memory system 110 may be a hard drive, a solid-state drive (SSD), a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), a CXL memory module, and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementa-tions, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, a CXL controller connected to DRAM, and/or one or more processing com-ponents. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB inter-face, a Universal Flash Storage (UFS) interface, an eMMC interface, a double data rate (DDR) interface, a DIMM interface, and/or a CXL interface (e.g., a PCIe/CXL inter-face, described in more detail below in connection with FIG. 2).

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

Although the example memory system 110 described above includes a memory system controller 115, in some implementations, the memory system 110 does not include a memory system controller 115. For example, an external controller (e.g., included in the host system 105) and/or one or more local controllers 125 included in one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may be configured to retrieve, via a first access operation, a block of user data, wherein the block of user data is stored in a first portion of a memory associated with one or more data pins and is retrievable, during the first access operation, using the one or more data pins, wherein internal memory ECC information associated with the block of user data is stored in a second portion of the memory associated with one or more DMI pins, and wherein data transfer via the one or more DMI pins is disabled to enable masked write commands using the one or more DMI pins; and retrieve, via a second access operation, CRC information associated with the block of user data, wherein the CRC information is stored in a third portion of the memory associated with the one or more data pins and is retrievable, during the second access operation, using the one or more data pins.

In some implementations, one or more systems, devices, apparatuses, components, and/or controllers of FIG. 1 may be configured to retrieve, via a first access operation, a block of user data, wherein the block of user data is stored in a first portion of a memory associated with one or more data pins and is retrieved, during the first access operation, using the one or more data pins, wherein internal memory ECC information associated with the block of user data is stored in a second portion of the memory associated with one or more DMI pins, and wherein data transfer via the one or more DMI pins is disabled to enable masked write commands using the one or more DMI pins; retrieve, via a second access operation, CRC information associated with the block of user data, wherein the CRC information is stored in a third portion of the memory associated with the one or more data pins and is retrieved, during the second access operation, using the one or more data pins; and determine, using the block of user data and the CRC information, whether the block of user data includes one or more bit errors.

In some implementations, one or more systems, devices, apparatuses, components, and/or controllers of FIG. 1 may be configured to retrieve, via a first access operation, a UDB, wherein the UDB is stored in a first portion of a DRAM associated with one or more DQ pins and is retrievable, during the first access operation, using the one or more DQ pins, wherein internal memory ECC information associated with the UDB is stored in a second portion of the DRAM associated with one or more DMI pins, and wherein data transfer via the one or more DMI pins is disabled to enable masked write commands using the one or more DMI pins; and retrieve, via a second access operation, CRC information associated with the UDB, wherein the CRC information is stored in a third portion of the DRAM associated with the one or more DQ pins and is retrievable, during the second access operation, using the one or more DQ pins.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
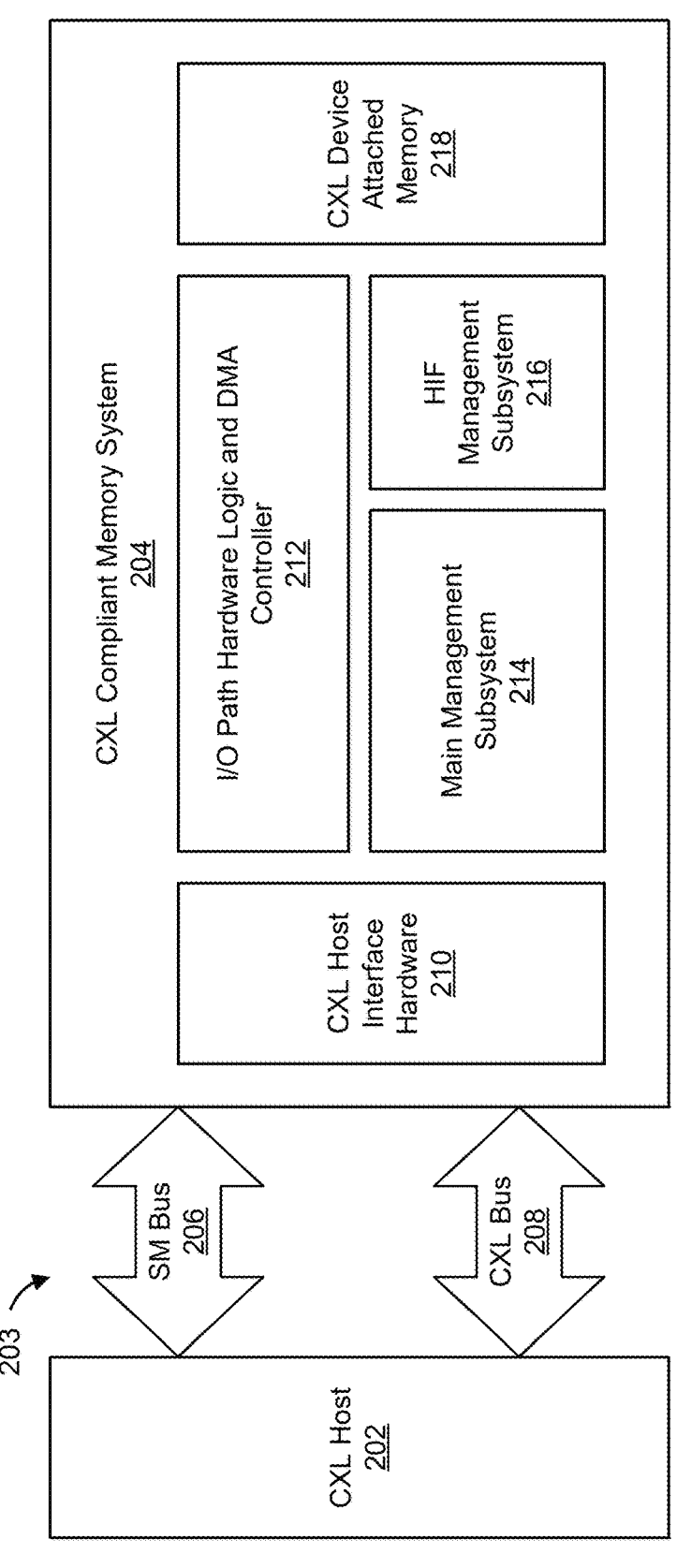
FIG. 2 is a diagram illustrating another example system capable of implementing internal memory ECCs in RAID-based memory systems.

FIG. 2 is a diagram illustrating another example system 200 capable of implementing internal memory ECCs in RAID-based memory systems. The system 200 may include one or more devices, apparatuses, and/or components for performing operations described herein. In some examples, the system 200 may be associated with a CXL standard and/or protocol (e.g., the system 200 may utilize a CXL protocol to communicate between a host device, sometimes referred to as a CXL compliant host system or simply a CXL host, and a memory system, sometimes referred to as a CXL compliant memory system or simply a CXL memory system). In that regard, the system 200 may include a CXL host 202 (e.g., a CXL compliant host system, which may correspond to the host system 105) and a CXL compliant memory system 204 (which may correspond to the memory system 110). The CXL host 202 and the CXL compliant memory system 204 may communicate via an interface 203 (e.g., host interface 140), which may include a system management (SM) bus 206 and/or a CXL bus 208 (e.g., a PCIe/CXL interface), among other examples.

In some examples, the CXL compliant memory system 204 may be a system that complies with the CXL standard and/or protocol, such as for a purpose of communicating with one or more host devices (e.g., a CXL compliant host, such as CXL host 202). CXL is an open standard that may enable high-speed CPU-to-device and CPU-to-memory interconnects designed to accelerate next-generation performance. The CXL standard may enable memory coherency between the CPU memory space and memory on attached devices, which allows resource sharing for higher performance, reduced software stack complexity, and lower overall system cost. CXL is designed to be an industry open standard for enabling an interface for high-speed communications. CXL technology utilizes the PCIe infrastructure, leveraging PCIe physical and electrical interfaces to provide an advanced protocol in areas such as input/output (I/O) protocol, memory protocol, and coherency interface.

In some examples, the system 200 may include a PCIe/CXL interface (e.g., the CXL bus 208 may be associated with a PCIe/CXL interface), which may be a physical interface configured to connect the CXL compliant memory system 204 to CXL compliant host devices, such as the CXL host 202. In such examples, the PCIe/CXL interface may comply with CXL standard specifications for physical connectivity, ensuring broad compatibility and case of integration into existing systems using the CXL protocol. Additionally, or alternatively, the CXL compliant memory system 204 may be designed to efficiently interface with computing systems (e.g., CXL host 202 and/or a host system 105) by leveraging the CXL protocol. For example, the CXL compliant memory system 204 may be configured to utilize high-speed, low-latency interconnect capabilities of CXL, such as for a purpose of making the CXL compliant memory system 204 suitable for high-performance computing, data center applications, artificial intelligence (AI) applications, and/or similar applications.

In some examples, the CXL compliant memory system 204 may include a CXL memory system controller (e.g., a CXL ASIC, which may correspond to the memory system controller 115 and/or local controller 125), which may be configured to manage data flow between memory arrays (shown as CXL device attached memory 218, which may correspond to the volatile memory arrays 135 and/or the memory arrays 130) and a CXL interface (e.g., the CXL bus 208). In some examples, the CXL memory system controller may be configured to handle one or more CXL protocol layers, such as an I/O layer (e.g., a layer associated with a CXL.io protocol, which may be used for purposes such as device discovery, configuration, initialization, I/O virtualization, direct memory access (DMA) using non-coherent load-store semantics, and/or similar purposes); a cache coherency layer (e.g., a layer associated with a CXL.cache protocol, which may be used for purposes such as caching host memory using a modified, exclusive, shared, invalid (MESI) coherence protocol, or similar purposes); or a memory protocol layer (e.g., a layer associated with a CXL.memory (sometimes referred to as CXL.mem) protocol, which may enable a CXL memory device to expose host-managed device memory (HDM) to permit a host device to manage and access memory similar to a native DDR connected to the host); among other examples.

The CXL compliant memory system 204 may further include and/or be associated with one or more high-bandwidth memory modules (HBMMs) or similar memory arrays (e.g., CXL device attached memory 218). For example, the CXL compliant memory system 204 may include multiple layers of DRAM (e.g., stacked and/or interconnected through advanced through-silicon via (TSV) technology) in order to maximize storage density and/or enhance data transfer speeds between memory layers. Additionally, or alternatively, the CXL compliant memory system 204 (e.g., a CXL ASIC of the CXL compliant memory system 204) may include a power management unit, which may be configured to regulate power consumption associated with the CXL compliant memory system 204 and/or which may be configured to improve energy efficiency for the CXL compliant memory system 204. Additionally, or alternatively, the CXL compliant memory system 204 (e.g., a CXL ASIC of the CXL compliant memory system 204) may include additional components, such as one or more error correction code (ECC) engines, such as for a purpose of detecting and/or correcting data errors to ensure data integrity and/or improve the overall reliability of the CXL compliant memory system 204. The CXL compliant memory system 204 may be implemented using a combination of hardware and firmware blocks and/or components. In such examples, the firmware may execute on one or more embedded CPUs within the CXL compliant memory system 204.

Additionally, or alternatively, the CXL compliant memory system 204 and/or a CXL memory system controller (e.g., a CXL ASIC) of the CXL compliant memory system 204 may include CXL host interface hardware 210, an I/O path hardware logic and DMA controller 212, a main management subsystem 214, and/or a host interface (HIF) management subsystem 216, among other examples. In some examples, the CXL host interface hardware 210 may be hardware components that enable physical connectivity between the CXL compliant memory system 204 and one or more external devices, such as to the CXL host 202 via the SM bus 206 and/or the CXL bus 208. In some examples, the CXL host interface hardware 210 may include the necessary physical interfaces and protocol logic required to establish and/or maintain communication over the CXL link (e.g., via the CXL bus 208). In some cases, the CXL host interface hardware 210 may ensure that the CXL host 202 can access and/or control the CXL compliant memory system 204 efficiently.

The I/O path hardware logic and DMA controller 212 may handle data transfers between the CXL compliant memory system 204 and external devices, such as other memory modules and/or peripheral components. In some examples, a DMA controller portion of the I/O path hardware logic and DMA controller 212 may permit efficient data transfer without involving a CXL compliant memory system 204 CPU, directly. Put another way, the DMA controller portion of the I/O path hardware logic and DMA controller 212 may manage data movement between the CXL compliant memory system 204 and other system components, which may enhance overall system performance by offloading data transfer tasks from the CPU.

The main management subsystem 214 may serve as a central control and management unit within the CXL compliant memory system 204. In some examples, the main management subsystem 214 may encompass various functionalities and tasks, such as memory access control, error detection and/or correction, power management, and/or similar system management functionalities and/or tasks. Additionally, or alternatively, the main management subsystem 214 may ensure proper functioning and/or reliability of the CXL compliant memory system 204 and/or may optimize the performance of the CXL compliant memory system 204 under various operating conditions.

The HIF management subsystem 216 may be responsible for managing and/or controlling the CXL host interface hardware 210, among other tasks. In some examples, the HIF management subsystem 216 may handle tasks related to link initialization configuration negotiation with the CXL host 202, error handling, and/or other protocol-specific functionalities. Additionally, or alternatively, the HIF management subsystem 216 may ensure smooth communication between the CXL compliant memory system 204 and/or the CXL host 202, such as by maintaining compatibility and/or reliability of the CXL link, among other examples.

In some examples, the CXL compliant memory system 204 may be categorized as a CXL type 1 device, a CXL type 2 device, or a CXL type 3 device. A CXL type 1 device may be a device that implements a coherent cache using the CXL.cache protocol. A CXL type 2 device may be a device that implements both a coherent cache using the CXL.cache protocol and a host-managed device memory using the CXL.mem protocol. For example, a CXL type 2 device may be a hardware accelerator device. A CXL type 3 device may be a device that implements a host-managed device memory using the CXL.mem protocol. For example, a CXL type 3 device may be a memory expander device.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3A:
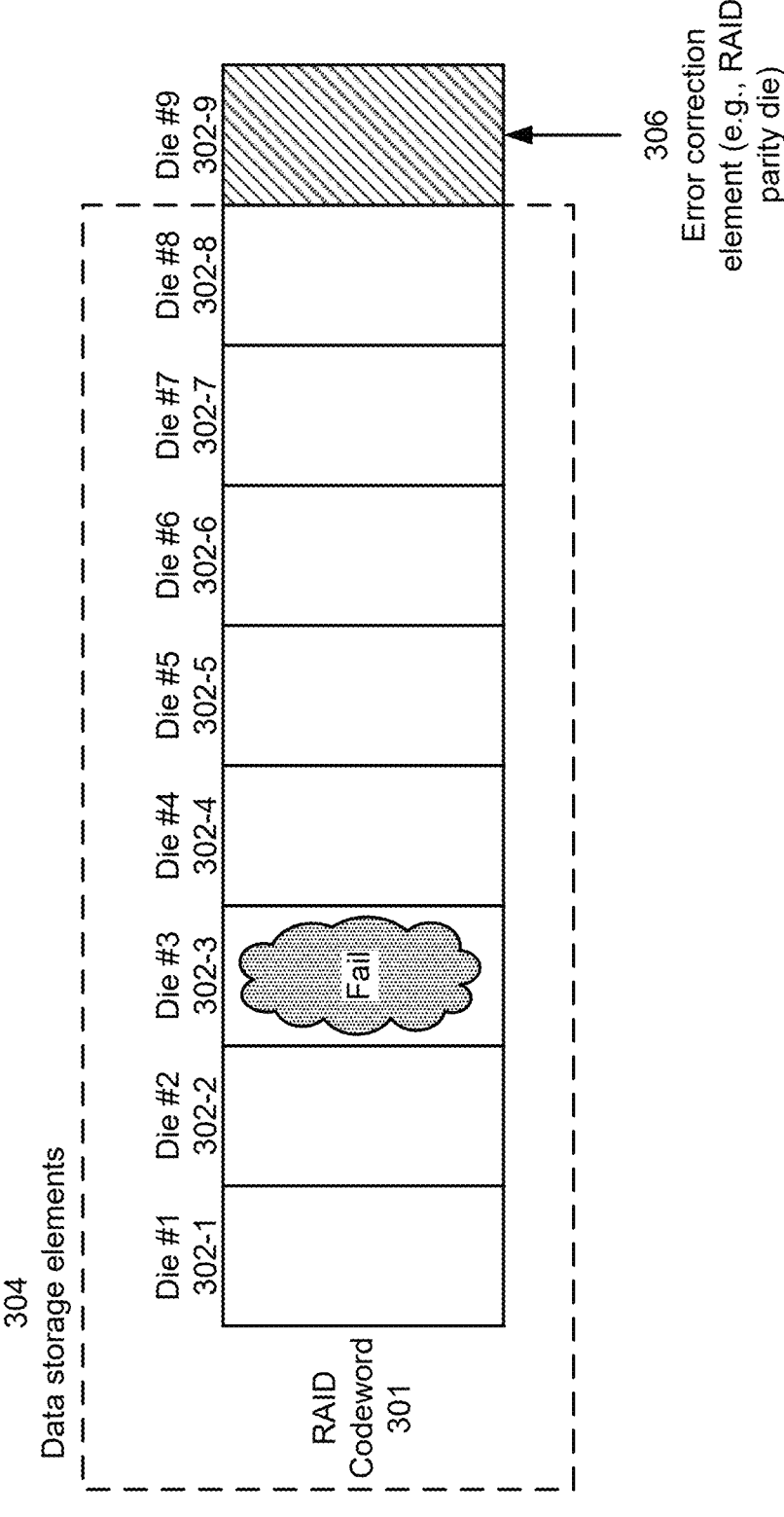
FIGS. 3A-3B are diagrams of examples associated with RAID error correction operations.
Figure 3B:
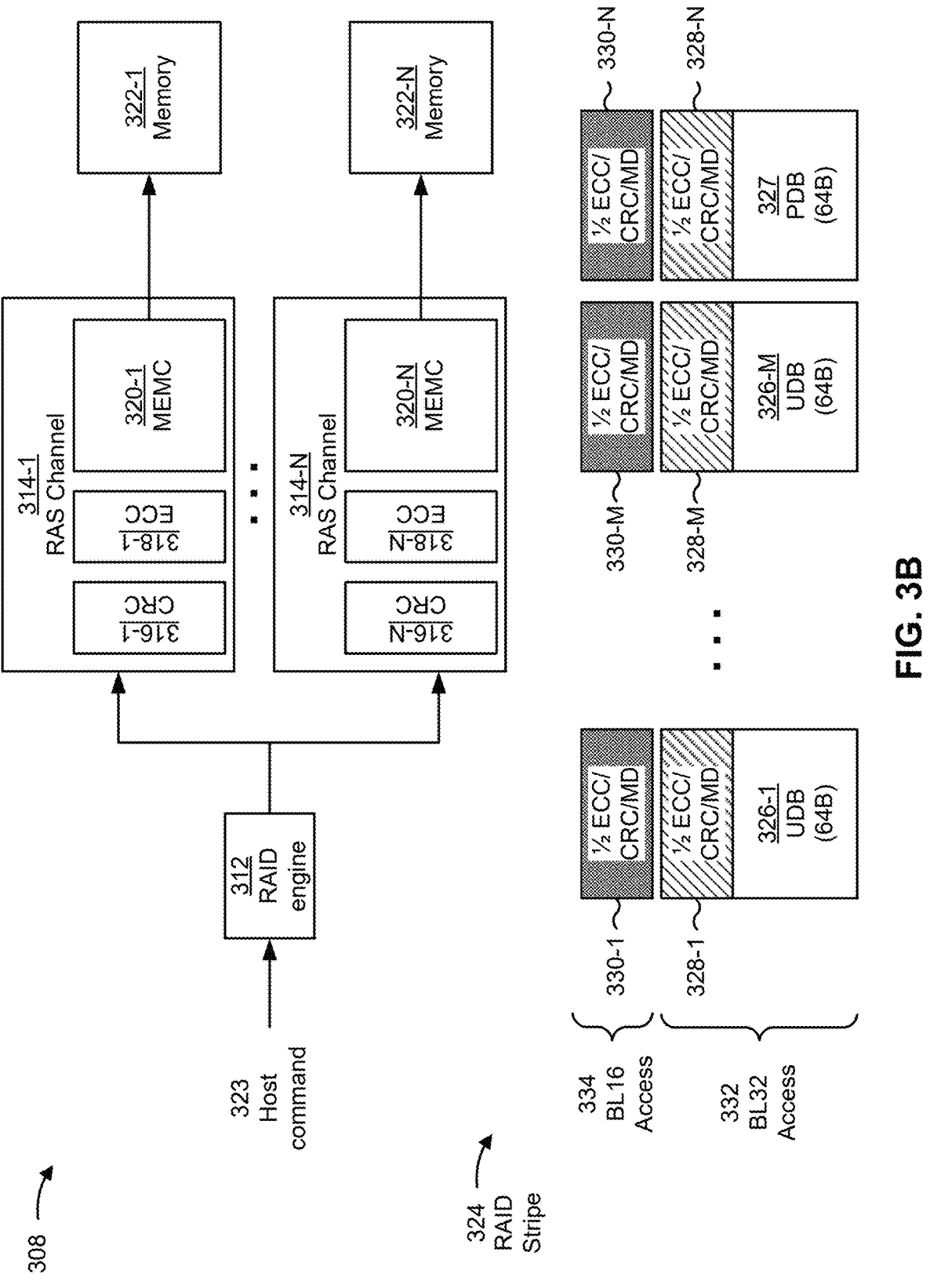

FIGS. 3A-3B are diagrams of examples associated with RAID error correction operations. The operations described in connection with FIGS. 3A-3B may be performed by the memory system 110 and/or one or more components of the memory system 110, such as the memory system controller 115, one or more memory devices 120, and/or one or more local controllers 125, and/or the CXL compliant memory system 204 and/or one or more components of the CXL compliant memory system 204, such as the main management subsystem 214 and/or the CXL device attached memory 218 (e.g., one or more memory controllers associated with the CXL device attached memory 218).

In some examples, a memory system may be configured to store host data across multiple memory locations, elements, and/or dies, such as for purposes of implementing a RAID error correction operation. In that regard, the memory system may be referred to as a RAID-based system. As shown in FIG. 3A, in some RAID-based systems, a memory system may store host data using multiple components (e.g., dies) that collectively form a RAID codeword 301 (sometimes referred to herein as a RAID stripe). The RAID codeword 301 may include multiple elements 302 (e.g., multiple arrays, dies, disks, or the like), shown in FIG. 3A as a first element 302-1 through a ninth element 302-9. In that regard, the RAID codeword 301 may include a logical group of memory elements (e.g., elements 302) associated with one another for performing certain operations (e.g., write operations, read operations, or erase operations, among other examples). In some examples, utilizing the RAID codeword 301 that includes multiple elements 302 may enable a memory system to utilize distributed parity and/or redundancy techniques such that, if one element 302 of the RAID codeword 301 fails, the memory system may restore host data using the other elements 302 in the RAID codeword 301.

More particularly, as indicated by reference number 304, the RAID codeword 301 may be associated with multiple data storage elements, such as the first element 302-1 through the eighth element 302-8 in the example shown in FIG. 3A, but which may include fewer or additional elements in some other examples. As indicated by reference number 306, the RAID codeword 301 may also be associated with an error correction element (e.g., a parity element), such as the ninth element 302-9 in the example shown in FIG. 3A. In some examples, the data storage elements may be used to store host data, and the error correction element may be used to stored parity bits used for error correction of the host data. In that regard, the data storage elements may form the payload of the RAID codeword 301 and the error correction element may form the parity of the RAID codeword 301. Put another way, in RAID-based systems, the data storage elements may be associated with a parity check payload, and the error correction element may be used to store parity bits associated with the parity check payload (e.g., RAID parity bits). In some cases, the parity bits may be derived from the party check payload, such as by performing an exclusive or (XOR) operation associated with the data bits stored on the data storage elements. For example, for a given bit location in the error correction element, a value of the error correction bit (e.g., parity bit) may be derived by performing an XOR operation using the data bits located at the given bit location of each data storage element.

Although nine total elements 302 (e.g., dies) are shown in FIG. 3A, in some other examples, a RAID codeword may be associated with fewer or additional elements. For example, in some examples, a RAID codeword may be associated with eighteen elements, such as seventeen data storage elements and a one error correction element (e.g., one parity element), among other examples. More generally, the RAID codeword 301 may be associated with N elements 302, with a first subset of the N elements 302 (e.g., M elements 302) being used to store user data, and with the a second subset of the N elements 302 (e.g., N-M elements 302) being used to store parity data.

In some examples, the set of parity bits included at the error correction element may be used to recover any data that is lost on a given data storage element, such as due to a failed die, disk, array, or the like. For example, each data storage element (e.g., the first element 302-1 through the eighth element 302-8) may include a respective set of CRC bits, such as a set of CRC bits stored in space of the data storage element that is not used for storing host data. In this way, if an error occurs at a data storage element, such as if the third data storage element 302-3 fails (as shown in FIG. 3A as "Fail"), the memory system may detect the error using a CRC check associated with the third data storage element 302-3. Once detected, the memory system may use the remaining data storage elements (e.g., the first element 302-1, the second element 302-2, and the fourth element 302-4 through the eighth element 302-8), as well as the error correction element (e.g., the ninth element 302-9) to recover the lost data associated with the failed third element 302-3. For example, the memory system may derive the lost data by adding (e.g., in a bitwise fashion using an XOR operation) host data bits stored at the remaining data storage elements (e.g., the first element 302-1, the second element 302-2, and the fourth element 302-4 through the eighth element 302-8) to the parity bits stored at the error correction element (e.g., the ninth element 302-9). Accordingly, the set of CRC bits at each data storage element may be used to detect errors associated with the corresponding data storage element, and the parity bits may be used to correct the errors associated with a data storage element for which an error is detected.

In some examples, invoking a RAID error correction operation may be time and/or resource intensive. Accordingly, a memory system may employ additional error correction mechanisms capable of correcting certain errors not associated with an entire failed die, such as single or multi-bit errors and/or single or multi-symbols errors, among other examples. More particularly, a memory system may utilize a single-error correction (SEC) code, such as for a purpose of reducing uncorrectable errors in a memory system and/or reducing a quantity of instances of RAID recovery in instances in which a data block includes a single bit error. In such memory systems, upon detecting the single bit error, the memory system may attempt to correct the error using an ECC, such as an SEC code or the like. In such cases, if the error is not correctable using the SEC code or similar ECC (such as in a case of multiple bit errs and/or a failed die, or the like), the memory system may thereafter invoke the RAID error correction operation in an effort to recover the lost data.

FIG. 3B shows an example of a memory architecture that may be implemented in RAID-based memory systems, among other examples. As indicated by reference number 308, in some implementations, a RAID stripe (e.g., RAID stripe 324, described in more detail below, which may correspond to the RAID codeword 301 described above in connection with FIG. 3A) may be associated with a RAID engine 312, which may be a component of a memory controller (e.g., a CXL ASIC, among other examples) capable of performing a RAID error correction operation, such as the RAID error correction operation described above in connection with FIG. 3A. In such examples, the RAID engine 312 may be associated with multiple (e.g., N, corresponding the N elements 302 making up the RAID codeword 301) reliability, accessibility, and serviceability (RAS) channels 314, shown in FIG. 3B as a first RAS channel 314-1 through an $N^{th}$ RAS channel 314-N. Each RAS channel 314 may include one or more components, such as a CRC component 316 (shown in FIG. 3B as a first CRC component 316-1 through an $N^{th}$ CRC component 316-N), an ECC component 318 (shown in FIG. 3B as a first ECC component 318-1 through an $N^{th}$ ECC component 316-N), and/or a memory controller 320 (shown in FIG. 3B as "MEMC" and indexed as a first memory controller 320-1 through an $N^{th}$ memory controller 320-N). Moreover, each RAS channel 314 may be used to access a memory component 322 (e.g., a memory die), shown in FIG. 3B as a first memory component 322-1 through an $N^{th}$ memory component 322-N. The memory components 322 may collectively form a RAID codeword (e.g., RAID codeword 301) and/or a RAID stripe (e.g., RAID stripe 324, described in more detail below). For example, in some implementations, the first memory component 322-1 may correspond to the first element 302-1 (e.g., die #1) of the RAID codeword 301 described above in connection with FIG. 3A, the $N^{th}$ memory component 322-N may correspond to the ninth element 302-9 (e.g., die #9) of the RAID codeword 301, and so forth, among other examples.

As indicated by reference number 323, upon receiving a host command, the RAID engine 312 may route the command to one or more RAS channels 314, such as for a purpose of accessing data and/or parity bits via the one or more RAS channels 314. More particularly, the RAID stripe 324 shows example user data and/or parity bits and associated information (e.g., ECC information, CRC information, metadata, and/or similar information) that may be accessed by the one or more RAS channels 314 in response to receiving a host command. In some aspects, a memory system may access data in blocks referred to as a UDB when used to store user data and a PDB when used to store parity bits associated with a RAID codeword.

The example RAID stripe 324 shown in FIG. 3B may be associated with a UDB 326 (e.g., a 64 byte block of data) for a first subset of the N memory components 322 (e.g., dies), and/or may be associated with a PDB 327 (e.g., a 64 byte block of parity bits) for a second subset of the N memory components 322 (e.g., dies). For example, in aspects in which the RAID stripe 324 is associated with one parity die, M memory components 322 may be used to store user data, where M is equal to N−1, and one memory component 322 may be used to store parity data. In such implementations, the RAID stripe 324 may be used to access data in 64 byte blocks via respective RAS channels 314, such as by accessing multiple 64 byte UDBs 326 (shown in FIG. 3B as a first UDB 326-1 through an $M^{th}$ UDB 326-M) and/or a 64 byte PDB 327.

In some examples, when accessing a block of data (e.g., a UDB 326 and/or a PDB 327, among other examples), a memory system may access additional information associated with the block of data. For example, the block of data may be associated with CRC information, which may be used by the memory system (e.g., a corresponding CRC component 316 of the respective RAS channel 314) to perform a CRC check to determine whether any data transmitted via a respective channel contains one or more bit errors; ECC information, which may be used by the memory system (e.g., a corresponding ECC component 318 of the respective RAS channel 314) to correct minor errors associated with a memory component 322, such a bit-flip errors or the like; and/or metadata (shown in FIG. 3B as "MD") associated with the block of data. In some examples, such as examples involving 64 byte UDBs 326 and/or 64 byte PDBs 327, each block of data (e.g., each UDB 326 and/or each PDB 327) may be associated with 8 bytes of additional information (e.g., 8 bytes of CRC information, ECC information, and/or metadata).

Additionally, or alternatively, a memory system may access a first portion (e.g., a first half) of the additional information using one or more DMI pins concurrent with accessing the block of data via one or more data pins (e.g., one or more DQ pins), and the memory system may access a second portion (e.g., a second half) of the additional information using a subsequent access of a memory component 322 using the data pins (e.g., DQ pins). More particularly, each UDB 326 and/or PDB 327 may be associated with a DLEP area 328 (shown in FIG. 3B as a first DLEP area 328-1 associated with the first UDB 326-1 through an $N^{th}$ DLEP area 328-N associated with the PDB 327), or a similar area. The DLEP area 328 may be a portion of a memory component 322 that is accessible in parallel with accessing the block of data, such as by using DMI pins associated with the memory component 322. In such examples, a portion of the additional information (e.g., half of the additional information) may be stored in the DLEP area 328 and/or may be accessed in parallel to the block of data by using the DMI pins. In some examples, this may be referred to as configuring the memory component in a "DLEP ON" mode. Additionally, or alternatively, each UDB 326 and/or PDB 327 may be associated with an extra area 330 (shown in FIG. 3B as a first extra area 330-1 associated with the first UDB 326-1 through an $N^{th}$ extra area 330-N associated with the PDB 327). The extra area 330 may be a portion of a memory component 322 that is accessible via the data pins (e.g., the DQ pins) during a subsequent access of the memory component 322. In such examples, a portion of the additional information (e.g., half of the additional information) may be stored in the extra area 330 and/or may be accessed after the block of data using a subsequent access of the DQ pins.

In some examples, such as in examples in which the UDB 326 and/or the PDB 327 are associated with 64 bytes of data, each RAS channel 314 may be associated with a 16-bit channel. Additionally, or alternatively, in some examples, an access operation used to retrieve a block of data (e.g., a UDB 326 or a PDB 327) may be a burst length 32 (BL32) access (as indicated by reference number 332), meaning that during a single access of the 16-bit channel associated with a memory component 322, the memory system may be capable of accessing up to 32×16 bits (e.g., 64 bytes) of data. Moreover, in aspects in which the block of data is associated with the DLEP area 328, during the BL32 access of the block of data, a memory controller may be capable of accessing, via the channel associated with the block of data, 4 bytes of additional data by using the DMI pins. Furthermore, in aspects in which the block of data is further associated with the extra area 330, an access operation used to retrieve the additional information from the extra area 330 (e.g., half of the CRC information, the ECC information, and/or the metadata) may be a burst length 16 (BL16) access (as indicated by reference number 334), meaning that during a single access of the 16-bit channel associated with a memory component 322, the memory system may be capable of accessing up to 16×16 bits (e.g., 32 bytes) of data via the DQ pins. In some examples, the additional information stored in the extra area 330 (e.g., half of the CRC information, the ECC information, and/or the metadata) may include 4 bytes of additional information. In that regard, even though the BL16 access results in access to 32 bytes of data overall, in some examples only 4 bytes may be relevant to the block of data accessed during the first access operation (e.g., the BL32 access).

Accordingly, in some examples, to access a block of data (e.g., a UDB 326 or a PDB 327) via a respective channel (e.g., an RAS channel 314, which may be associated with a 16-bit channel), the memory system may perform a first access (e.g., a BL32 access, as indicated by reference number 332), which may include retrieving the block of data (e.g., a UDB 326 or a PDB 327) using the DQ pins and/or retrieving a portion of additional information associated with the block of data (e.g., a portion of CRC information, ECC information, and/or metadata) from the DLEP area 328 using the DMI pins. Additionally, the memory system may perform a second access (e.g., a BL16 access, as indicated by reference number 334), which may include retrieving another portion of additional information associated with block of data (e.g., another portion of CRC information, ECC information, and/or metadata) from the extra area 330 using the DQ pins.

In some examples, a host command (e.g., the host command described above in connection with 323) may result in the memory system accessing a single RAS channel 314 and/or block of data (e.g., a single UDB 326 or PDB 327), while, in some other examples, a host command may result in the memory system accessing multiple RAS channels 314 and/or blocks of data. For example, to serve a host read command (e.g., in examples in which the host command described above in connection with reference number 323 is a read command), the RAID engine 312 may issue, on a selected RAS channel 314 (e.g., a RAS channel 314 associated with a memory component 322 corresponding to an address of the read command), a first read command to load a UDB 326 and a first portion of the additional information stored in the corresponding DLEP area 328 (e.g., using a first access operation, such as the BL32 access operation described above in connection with reference number 332), and a second read command to load a second portion of the additional information stored in the corresponding extra area 330 (e.g., using a second access operation, such as the BL16 access operation described above in connection with reference number 334). In that regard, to serve a host read command, the RAID engine 312 may issue one read command with a BL32 access and one read command with a BL16 access.

To serve a host write command (e.g., in examples in which the host command described above in connection with reference number 323 is a write command), the memory system may need to first read data from both a data storage element and a parity element, and then write new data to the data storage element and the parity element, meaning the memory system may perform both read and write operations in response to receiving a host write command. More particularly, the RAID engine 312 may issue a first read command (e.g., using a BL32 access) to load a UDB 326 and a first portion of the additional information stored in the corresponding DLEP area 328, and a second read command (e.g., using a BL16 access) to load a second portion of the additional information stored in the corresponding extra area 330. Moreover, the RAID engine 312 may issue a third read command (e.g., using a BL32 access) to load a PDB 327 belonging to the RAID stripe 324 that includes the UDB 326 being written to as well as a first portion of the additional information stored in the corresponding DLEP area 328, and a fourth read command (e.g., using a BL16 access) to load a second portion of the additional information stored in the corresponding extra area 330.

Additionally, the RAID engine 312 may issue a first write command (e.g., using a BL32 access) to write the new data to the UDB 326 and a first portion of new additional information associated with the UDB 326 to the corresponding DLEP area 328, and a second write command (e.g., using a BL16 access) to write a second portion of the new additional information associated with the UDB 326 to the corresponding extra area 330. Moreover, the RAID engine 312 may issue a third write command (e.g., using a BL32 access) to write new parity data to the PDB 327 and a first portion of the new additional information associated with the PDB 327 to the corresponding DLEP area 328, and a fourth write command (e.g., using a BL32 access) to write a second portion of the new additional information associated with the PDB 327 to the corresponding extra area 330. In that regard, to serve a host write command, the RAID engine 312 may issue two read commands with a BL32 access, two read commands with a BL16 access, two write commands with a BL32 access, and two write commands with a BL16 access.

In connection with a host read and/or write command, upon loading a UDB 326 and/or a PDB 327 and associated additional information (e.g., CRC information, ECC information, and/or metadata), the memory system may solve minor errors (e.g., bit flip errors) using the ECC information, check for one or more additional errors using the CRC information, and/or invoke a RAID error correction operation when necessary to recover any lost or corrupted data. More particularly, the ECC component 318 of a respective RAS channel 314 may use the retrieved ECC information to correct minor bit flip errors or similar errors in the UDB 326 and/or the PDB 327. After correcting any minor errors, the CRC component 316 of the respective RAS channel 314 may use the retrieved CRC information to identify any errors not solved by the ECC component 318. In a case in which a CRC check fails (e.g., when the CRC component 316 identifies one or more bit errors using the CRC information), the memory system (e.g., the RAID engine 312 of the memory system) may invoke a RAID error correction operation to recover the lost data using other data in the in RAID stripe 324, in a similar manner as described above in connection with FIG. 3A.

In some examples, configuring the memory components in this manner may result in high resource consumption and/or large ASIC footprints, among other examples. For example, because the DLEP area 328 is used to store a portion of the additional information and/or because the DMI pins are used to retrieve data during the first access operation (put another way, because the memory components 322 described above are configured in a DLEP ON mode), masked write commands may be unavailable for writing data to the memory components. This may result in high storage consumption because SRAM or similar storage may be needed to hold data read during a host write flow. Moreover, because ECC information associated with the blocks of data (e.g., the UDB 326 and/or the PDB 327) are transmitted in the RAS channel 314 as part of the data accessed by the first access operation (e.g., the BL32 access) and/or the second access operation (e.g., the BL16 access) (e.g., because the ECC information is used for purposes of an ECC operation external to a memory die, sometimes referred to herein as an external ECC operation), error correction operations may be performed on an ASIC associated with the memory system (e.g., a CXL ASIC), such as by using the ECC component 318. This requires a large ASIC footprint to accommodate the various RAS channels 314. Moreover, in some examples an external ECC operation may cover less error patterns and/or scenarios than an internal ECC operation (e.g., an ECC operation internal to a memory die, sometimes referred to herein as an on-die ECC operation), resulting in high rates of uncorrectable errors and thus high RAID invocation, which may be time and resource intensive.

As indicated above, FIGS. 3A-3B are provided as examples. Other examples may differ from what is described with regard to FIGS. 3A-3B.

Figure 4:
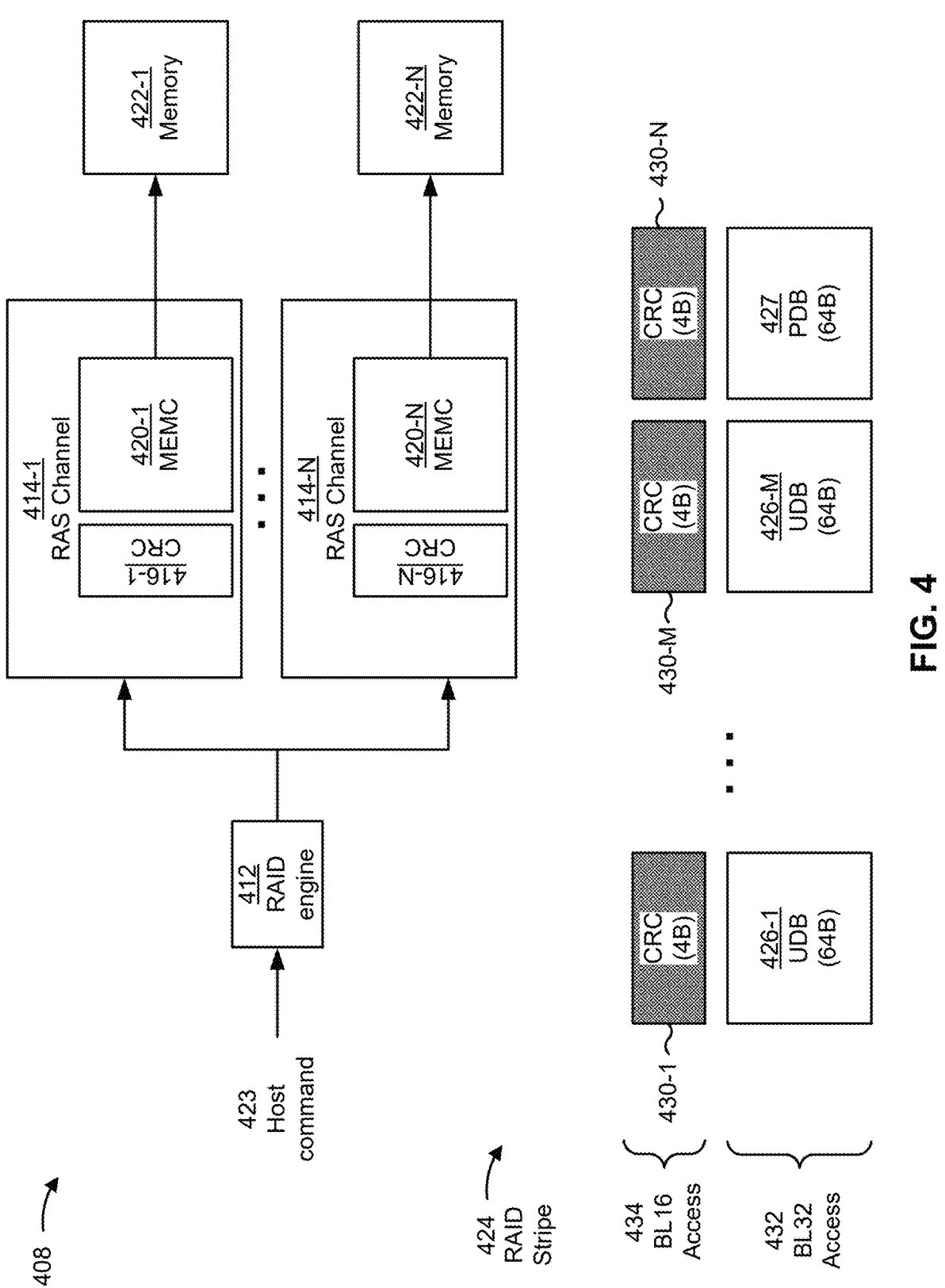
FIG. 4 is a diagram of an example associated with internal memory ECC information for memory systems.

FIG. 4 is a diagram of an example associated with internal memory ECC information for memory systems. The operations described in connection with FIG. 4 may be performed by the memory system 110 and/or one or more components of the memory system 110, such as the memory system controller 115, one or more memory devices 120, and/or one or more local controllers 125, and/or the CXL compliant memory system 204 and/or one or more components of the CXL compliant memory system 204, such as the main management subsystem 214 and/or the CXL device attached memory 218 (e.g., one or more memory controllers associated with the CXL device attached memory 218).

As indicated by reference number 408, in some implementations, a RAID stripe (e.g., RAID stripe 424, described in more detail below, which may correspond to the RAID codeword 301 described above in connection with FIG. 3A) may be associated with a RAID engine 412, which may correspond to the RAID engine 312 described above in connection with FIG. 3B. In that regard, the RAID engine 412 may be associated with multiple (e.g., N) RAS channels 414, shown in FIG. 4 as a first RAS channel 414-1 through an $N^{th}$ RAS channel 414-N. Each RAS channel 414 may include one or more components, such as a CRC component 416 (shown in FIG. 4 as a first CRC component 416-1 through an $N^{th}$ CRC component 416-N, which may correspond to the first CRC component 316-1 through the $N^{th}$ CRC component 316-N described above in connection with FIG. 3B) and/or a memory controller 420 (shown in FIG. 4 as a first memory controller 420-1 through an $N^{th}$ memory controller 420-N, which may correspond to the first memory controller 320-1 through the $N^{th}$ memory controller 320-N described above in connection with FIG. 3B). In some implementations, certain components of traditional RAS channels, such as the ECC components 318 described above in connection with FIG. 3B, may be omitted. This is because ECC information may not be transmitted via a respective RAS channel 414 (e.g., because, unlike the example described above in connection with FIG. 3B, an external ECC operation may not be utilized), which is described in more detail below. In such implementations, an ASIC footprint may be reduced and/or channel bandwidth may be increased as compared to the RAS channels 314 described above, among other examples.

In a similar manner as described above in connection with FIG. 3B, each RAS channel 414 may be used to access a respective memory component 422 (e.g., a memory die), shown in FIG. 4 as a first memory component 422-1 through an $N^{th}$ memory component 422-N (which, in some implementations, may correspond to the first memory component 322-1 through the $N^{th}$ memory component 322-N described above in connection with FIG. 3B). Each memory component 422 may be associated with a RAID codeword (e.g., RAID codeword 301) and/or a RAID stripe (e.g., RAID stripe 424, which is described in more detail below). For example, the first memory component 422-1 may correspond to the first element 302-1 (e.g., die #1) of the RAID codeword 301 described above in connection with FIG. 3A, the $N^{th}$ memory component 422-N may correspond to the ninth element 302-9 (e.g., die #9) of the RAID codeword 301, and so forth, among other examples.

In that regard, and as indicated by reference number 423, upon receiving a host command, the RAID engine 412 may route the command to one or more RAS channels 414, such as for a purpose of accessing data and/or parity bits via the one or more RAS channels 414, in a similar manner as described above in connection with FIG. 3B. More particularly, the RAID stripe 424 shows example user data and/or parity bits and associated information (e.g., CRC information) that may be accessed by the one or more RAS channels 414 in response to receiving a host command. In this implementation, the blocks of data to be accessed may not be associated with metadata. Put another way, in this implementation it may not be necessary to transmit metadata along with blocks of data. In such examples, omitting transmission of metadata (such as the metadata described above in connection with the DLEP area 328 and/or the extra area 330) enables disablement of the DMI pins for data transfer purposes (sometimes referred to herein as configuring the memory component in a "DLEP OFF" mode), thereby enabling the usage of internal memory ECC information (e.g., on-die ECC information) and/or masked write commands, which is described in more detail below.

Accordingly, the RAID stripe 424 in this implementation may not include information that is stored in a DLEP area (e.g., the DLEP area 328 described above in connection with FIG. 3B), but instead any additional information (e.g., CRC information in this example) may be retrievable solely via the second access (e.g., the BL16 access). More particularly, the example RAID stripe 424 shown in FIG. 4 may be associated with a 64 byte UDB 426 for a first subset of the N memory components 422 (e.g., dies), and/or may be associated with a 64 byte PDB 427 for a second subset of the N memory components 422 (e.g., dies). For example, in aspects in which the RAID stripe 424 is associated with one parity die, M memory components 422 may be used to store user data, where M is equal to N−1, and one memory component 422 may be used to store parity data. In such implementations, the RAID stripe 424 may be used to access data in 64 byte blocks via respective RAS channels 414, such as by accessing multiple 64 byte UDBs 426 (shown in FIG. 4 as a first UDB 326-1 through an M$^{th}$ UDB 426-M) and/or a 64 byte PDB 427.

Moreover, in this implementation, each UDB 426 and/or PDB 427 may be associated with CRC information to be transmitted via the RAS channel 314, but no metadata information and/or ECC information to be transmitted via the RAS channel 314. More particularly, each UDB 426 and PDB 427 may be associated with a corresponding extra area 430 (shown in FIG. 4 as a first extra area 430-1 associated with the first UDB 426-1 through an N$^{th}$ extra area 430-N associated with the PDB 427). In a similar manner as described above in connection with the extra area 330 of FIG. 3B, the extra area 430 may be a portion of a memory component 422 that is accessible via the data pins (e.g., the DQ pins) during a subsequent access of the memory component 422. In such examples, a block of data (e.g., a UDB 426 or a PDB 427) may be accessed in via a first access operation via the DQ pins (during which no data may be accessed via the DMI pins because the memory component 422 may be configured in a DLEP OFF mode, as described above), and associated CRC information may be accessed after the block of data using a subsequent access of the DQ pins.

In some implementations, such as in examples in which the UDB 426 and/or the PDB 427 is associated with 64 bytes of data, each RAS channel 414 may be associated with a 16-bit channel. Additionally, or alternatively, in some imple-mentations, an access operation used to retrieve a block of data (e.g., a UDB 426 or a PDB 427) may be a BL32 access, as indicated by reference number 432. Furthermore, in aspects in which the block of data is associated with the extra area 430 (e.g., to store 32 bits of CRC information, among other examples), an access operation used to retrieve the CRC information from the extra area 430 may be a BL16 access, as indicated by reference number 434. In some examples, the CRC information stored in the extra area 430 may include 4 bytes of CRC information. In that regard, even though the BL16 access results in access to 32 bytes of data overall, in some examples only 4 bytes may be relevant to the block of data accessed during the first access operation (e.g., during the BL32 access).

Accordingly, in some examples, to access a block of data (e.g., a UDB 426 or a PDB 427) via a respective channel (e.g., an RAS channel 414, which may be associated with a 16-bit channel), the memory system may perform a first access (e.g., a BL32 access, as indicated by reference number 432), which may include retrieving the block of data (e.g., a UDB 426 or a PDB 427) using the DQ pins. Additionally, the memory system may perform a second access (e.g., a BL16 access, as indicated by reference number 434), which may include retrieving CRC information associated with a block of data from the extra area 430 using the DQ pins.

In a similar manner as described above in connection with FIG. 3B, a host command (e.g., the host command described above in connection with 423) may result in the memory system accessing a single RAS channel 414 and/or block of data (e.g., a single UDB 426 or PDB 427), while, in some other examples, a host command may result in the memory system accessing multiple RAS channels 414 and/or blocks of data. In this example, however, because no data is retrieved via the DMI pins (e.g., because the memory components 422 may be configured in a DLEP OFF mode), masked write commands may be available when writing data to the memory components 422. Put another way, in some implementations, data transfer via the one or more DMI pins may be disabled to enable masked write commands using the one or more DMI pins. Moreover, because data transfer via the DMI pins may be disabled, additional information associated with the block of data that is to be used only internally (e.g., information to be used at the die and/or that is not to be transmitted via the RAS channel 414) may be stored in an area associated with the DMI pins (e.g., the DLEP area 328). For example, in some implementations, internal memory ECC information (e.g., on-die ECC information) may be stored in the area associated with the DMI pins (e.g., the DLEP area 328). In some implementations, storing internal memory ECC information in the area associated with the DMI pins may enable internal memory ECC operations (e.g., on-die ECC operations), which may be capable of handling more error patterns and/or scenarios than external ECC operations, thereby improving error coverage and thus reducing a rate of resource-intensive RAID recovery invocation. Additionally, or alternatively, configuring the memory components 422 in a DLEP OFF mode may enable the use of link ECC operations (e.g., an ECC operation designed to cover transmission random errors on a memory system link, such as a low power DDR 5 (LPDDR5) link), further improving error coverage and thus reducing a rate of resource-intensive RAID recovery invocation.

For example, to serve a host read command (e.g., in examples in which the host command described above in connection with reference number 423 is a read command), the RAID engine 412 may issue, on a selected RAS channel 414 (e.g., a RAS channel 414 associated with a memory component 322 corresponding to an address of the read command), a first read command to load a UDB 426 (e.g., using a first access operation, such as the BL32 access operation described above in connection with reference number 432), and a second read command to load the CRC information stored in the corresponding extra area 430 (e.g., using a second access operation, such as the BL16 access operation described above in connection with reference number 434). In that regard, to serve a host read command, the RAID engine 412 may issue one read command with a BL32 access and one read command with a BL16 access.

To serve a host write command (e.g., in examples in which the host command described above in connection with reference number 423 is a write command), the memory system may need to first read data from both a data storage element and a parity element, and then write data to the data storage element and the parity element (which, in some implementations, may be performed using a masked write command because the memory components 422 may have been configured in a DLEP OFF mode, as described). More particularly, the RAID engine 412 may issue a first read command (e.g., using a BL32 access) to load a UDB 426, and a second read command (e.g., using a BL16 access) to load the CRC information stored in the corresponding extra area 430. Moreover, the RAID engine 412 may issue a third read command (e.g., using a BL32 access) to load a PDB 427 (e.g., a PDB 427 of the same RAID stripe 424 as the UDB 426 being written to), and a second read command (e.g., using a BL16 access) to load the CRC information in the corresponding extra area 430.

Additionally, the RAID engine 412 may issue a first write command (e.g., using a BL32 access) to write the new data to the UDB 426, and a first masked write command (e.g., using a BL16 access) to write the new CRC information to the corresponding extra area 430. Moreover, the RAID engine 412 may issue a second write command (e.g., using a BL32 access) to write new parity data to the PDB 427, and a second masked write command (e.g., using a BL16 access) to write new CRC information associated with the PDB 427 to the corresponding extra area 430. In that regard, to serve a host write command, the RAID engine 412 may issue two read commands with a BL32 access, two read commands with a BL16 access, two write commands with a BL32 access, and two masked write commands with a BL16 access.

As described above, in some implementations, the usage of masked write (e.g., to write the new CRC information) reduces storage resources (e.g., SRAM resources) otherwise required to store data that is read when serving a host write command. Moreover, enabling internal memory ECC operations (e.g., on-die ECC operations) may reduce an area of a controller (e.g., a CXL ASIC) associated with each RAS channel 414, because an external memory ECC component (e.g., ECC component 318) may no longer be required. Additionally, or alternatively, configuring the memory components 422 in a DLEP OFF mode may enable the use of the internal memory ECC operations that cover more error patterns and/or scenarios as compared external ECC operations, improving error coverage and thus reducing a rate of invoking RAID error recovery operations. Additionally, or alternatively, configuring the memory components 422 in a DLEP OFF mode may enable the use of link ECC operations that are designed to cover transmission random errors on LPDDR5 links, among other examples, thus further improving error coverage and thus reducing a rate of invoking RAID error recovery operations.

As indicated above, FIG. 4 is provided as an example. Other examples may differ from what is described with regard to FIG. 4.

FIG. 5 is a flowchart of an example method 500 associated with internal memory ECC information for memory systems. In some implementations, a memory system (e.g., the memory system 110) may perform or may be configured to perform the method 500. In some implementations, another device or a group of devices separate from or including the memory system (e.g., CXL compliant memory system 204) may perform or may be configured to perform the method 500. Additionally, or alternatively, one or more components of the memory system (e.g., memory system controller 115, local controller 125, main management subsystem 214, and/or a CXL ASIC) may perform or may be configured to perform the method 500. Thus, means for performing the method 500 may include the memory system and/or one or more components of the memory system. Additionally, or alternatively, a non-transitory computer-readable medium may store one or more instructions that, when executed by the memory system, cause the memory system to perform the method 500.

As shown in FIG. 5, the method 500 may include retrieving, using a first access operation, a block of user data, wherein the block of user data is stored in a first portion of a memory associated with one or more data pins and is retrieved, during the first access operation, using the one or more data pins, wherein internal memory ECC information associated with the block of user data is stored in a second portion of the memory associated with one or more DMI pins, and wherein data transfer via the one or more DMI pins is disabled to enable masked write commands using the one or more DMI pins (block 510). For example, the memory system (e.g., CXL compliant memory system 204) may retrieve, using the BL32 access operation described above in connection with reference number 432, a UDB 426 that is stored in a portion of a memory component 422 that is accessible via the DQ pins. In such examples, the memory component 422 may be configured in a DLEP OFF mode to enable masked write commands and/or such that on-die ECC information may be stored in a portion of the memory component 422 that is otherwise accessible via the DMI pins (e.g., the DLEP area 328), as described above in connection with FIG. 4.

As further shown in FIG. 5, the method 500 may include retrieving, via a second access operation, CRC information associated with the block of user data, wherein the CRC information is stored in a third portion of the memory associated with the one or more data pins and is retrieved, during the second access operation, using the one or more data pins (block 520). For example, the memory system (e.g., CXL compliant memory system 204) may retrieve, using the BL16 access operation described above in connection with reference number 434, CRC information that is stored in an extra area 430 of the memory component 422 that corresponds to the accessed UDB 426 and/or that is accessible during the subsequent access (e.g., the BL16 access) via the DQ pins, as described above in connection with FIG. 4.

As further shown in FIG. 5, the method 500 may include determining, using the block of user data and the CRC information, whether the block of user data includes one or more bit errors (block 530). For example, the memory system (e.g., CXL compliant memory system 204) may perform a CRC check using the UDB 426 and the CRC information associated with the UDB 426 and that is retrieved from the extra area 430, such as for a purpose of determining whether to invoke a RAID error correction operation, as described above in connection with FIG. 4.

The method 500 may include additional aspects, such as any single aspect or any combination of aspects described below and/or described in connection with one or more other methods or operations described elsewhere herein.

In a first aspect, the block of user data and the CRC information are associated with a write command received from a host system, and the method 500 further comprises causing updated CRC information to be written to the third portion of the memory using a masked write command. For example, the memory system (e.g., CXL compliant memory system 204) may cause updated CRC information to be written to the extra area 430 using the masked write command (which may be enabled by configuring the memory component 422 in a DLEP OFF mode), as described above in connection with FIG. 4.

In a second aspect, alone or in combination with the first aspect, the method 500 includes determining, by an internal memory ECC component, that the block of user data includes a bit error, and correcting, by the internal memory ECC component, the bit error using the internal memory ECC information, wherein correcting the bit error using the internal memory ECC information by the internal memory ECC component is performed prior to retrieving the block of user data by the memory system controller. For example, by configuring the memory component 422 in a DLEP OFF mode, the DLEP area (e.g., DLEP area 328) may be used to store internal memory ECC information (e.g., on-die ECC information), such that certain errors may be corrected prior to transmitting the UDB 426 in the RAS channel 414, as described above in connection with FIG. 4.

In a third aspect, alone or in combination with one or more of the first and second aspects, the block of user data includes only 64 bytes of user data, and the CRC information includes only 32 bits of CRC information. For example, the UDB 426 may include 64 bytes (e.g., accessed via a BL32 access of a 16-bit channel, as described above in connection with reference number 432), and/or the corresponding CRC information may include 32 bits (e.g., accessed via a BL16 access of the 16-bit channel, as described above in connection with reference number 434), as described above in connection with FIG. 4.

In a fourth aspect, alone or in combination with one or more of the first through third aspects, the first access operation is associated with a first burst length quantity, wherein the second access operation is associated with a second burst length quantity, and wherein the second burst length quantity is less than the first burst length quantity. For example, the first access operation may be associated with a BL32 access, as described above in connection with reference number 432, and/or the second access operation may be associated with an access operation having a burst length of less than 32, such as a BL16 access, as described above in connection with reference number 434.

In a fifth aspect, alone or in combination with one or more of the first through fourth aspects, the first access operation is associated with a burst length 32 access operation, and wherein the second access operation is associated with a burst length 16 access operation. For example, the first access operation may be associated with a BL32 access, as described above in connection with reference number 432, and/or the second access operation may be associated with a BL16 access, as described above in connection with reference number 434.

In a sixth aspect, alone or in combination with one or more of the first through fifth aspects, the block of user data is associated with a RAS channel, and the RAS channel is associated with a CRC component that is capable of detecting errors in the block of user data using the block of user data and the CRC information. For example, the UDB 426 may be associated with the RAS channel 414 that includes the CRC component 416, as described above in connection with FIG. 4.

In a seventh aspect, alone or in combination with one or more of the first through sixth aspects, the method 500 includes correcting, using a link ECC operation, one or more bit errors that occurred during a transmission of the block of user data. For example, configuring the memory component 422 in a DLEP OFF mode may enable the use of a link ECC operation (such as in implementations in which the memory system is associated with a LPDDR5 memory system), as described above in connection with FIG. 4.

In an eighth aspect, alone or in combination with one or more of the first through seventh aspects, determining whether the block of user data includes the one or more bit errors includes determining, using the block of user data and the CRC information, that the block of user data does include the one or more bit errors, and the method 500 further comprises initiating, by the memory system controller, a redundant array of independent disks error correction operation based on determining that the block of user data does include the one or more bit errors. For example, when a CRC check fails, the memory system (e.g., the RAID engine 412 of the memory system, such as CXL compliant memory system 204) may invoke a RAID error correction operation, such as the RAID error correction operation described above in connection with FIG. 3A.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

In some implementations, a memory system includes one or more components configured to: retrieve, via a first access operation, a block of user data, wherein the block of user data is stored in a first portion of a memory associated with one or more data pins and is retrievable, during the first access operation, using the one or more data pins, wherein internal memory error correction code (ECC) information associated with the block of user data is stored in a second portion of the memory associated with one or more data mask inversion (DMI) pins, and wherein data transfer via the one or more DMI pins is disabled to enable masked write commands using the one or more DMI pins; and retrieve, via a second access operation, cyclic redundancy check (CRC) information associated with the block of user data, wherein the CRC information is stored in a third portion of the memory associated with the one or more data pins and is retrievable, during the second access operation, using the one or more data pins.

In some implementations, a method includes retrieving, by a memory system controller via a first access operation, a block of user data, wherein the block of user data is stored in a first portion of a memory associated with one or more data pins and is retrieved, during the first access operation, using the one or more data pins, wherein internal memory error correction code (ECC) information associated with the block of user data is stored in a second portion of the memory associated with one or more data mask inversion (DMI) pins, and wherein data transfer via the one or more DMI pins is disabled to enable masked write commands using the one or more DMI pins; retrieving, by the memory system controller via a second access operation, cyclic redundancy check (CRC) information associated with the block of user data, wherein the CRC information is stored in a third portion of the memory associated with the one or more data pins and is retrieved, during the second access operation, using the one or more data pins; and determining, by the memory system controller and using the block of user data and the CRC information, whether the block of user data includes one or more bit errors.

In some implementations, a compute express link (CXL) compliant memory system includes one or more components configured to: retrieve, by a CXL controller and via a first access operation, a user data block (UDB), wherein the UDB is stored in a first portion of a dynamic random access memory (DRAM) associated with one or more DQ pins and is retrievable, during the first access operation, using the one or more DQ pins, wherein internal memory error correction code (ECC) information associated with the UDB is stored in a second portion of the DRAM associated with one or more data mask inversion (DMI) pins, and wherein data transfer via the one or more DMI pins is disabled to enable masked write commands using the one or more DMI pins; and retrieve, via a second access operation, cyclic redundancy check (CRC) information associated with the UDB, wherein the CRC information is stored in a third portion of the DRAM associated with the one or more DQ pins and is retrievable, during the second access operation, using the one or more DQ pins.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory system, comprising:
one or more components configured to:
   retrieve, via a first access operation, a block of user data,
      wherein the block of user data is stored in a first portion of a memory associated with one or more data pins and is retrievable, during the first access operation, using the one or more data pins, and
      wherein on-die error correction code (ECC) information associated with the block of user data is stored in a second portion of the memory associated with one or more data mask inversion (DMI) pins;
   retrieve, via a second access operation, cyclic redundancy check (CRC) information associated with the block of user data as part of a mode in which data transfer via the one or more DMI pins is disabled,
      wherein the CRC information is stored in a third portion of the memory associated with the one or more data pins and is retrievable, during the second access operation, using the one or more data pins; and
   write, via a third access operation, updated CRC information to the third portion of the memory using a masked write command using the DMI pins as part of the mode in which data transfer via the one or more DMI pins is disabled.

2. The memory system of claim 1, wherein the block of user data and the CRC information are associated with a write command received from a host system.

3. The memory system of claim 1, wherein the one or more components are further configured to:

determine that the block of user data includes a bit error; and correct the bit error using the on-die ECC information prior to retrieving the block of user data via the first access operation.

4. The memory system of claim 1, wherein the block of user data includes only 64 bytes of user data, and wherein the CRC information includes only 32 bits of CRC information.

5. The memory system of claim 1, wherein the first access operation is associated with a first burst length quantity, wherein the second access operation is associated with a second burst length quantity, and wherein the second burst length quantity is less than the first burst length quantity.

6. The memory system of claim 1, wherein the first access operation is associated with a burst length 32 access operation, and wherein the second access operation is associated with a burst length 16 access operation.

7. The memory system of claim 1, wherein the block of user data is associated with a reliability, availability, and serviceability (RAS) channel, and wherein the RAS channel is associated with a CRC component that is capable of detecting errors in the block of user data, using the block of user data and the CRC information.

8. The memory system of claim 1, wherein the one or more components are further configured to correct, using a link ECC operation, one or more bit errors that occurred during a transmission of the block of user data.

9. The memory system of claim 1, wherein the one or more components are further configured to:

determine, using the CRC information, that the block of user data includes one or more bit errors; and initiate a redundant array of independent disks error correction operation based on determining that that the block of user data includes one or more bit errors.

10. A method, comprising:

retrieving, by a memory system controller via a first access operation, a block of user data, wherein the block of user data is stored in a first portion of a memory associated with one or more data pins and is retrieved, during the first access operation, using the one or more data pins, and wherein on-die error correction code (ECC) information associated with the block of user data is stored in a second portion of the memory associated with one or more data mask inversion (DMI) pins;

retrieving, by the memory system controller via a second access operation, cyclic redundancy check (CRC) information associated with the block of user data as part of a mode in which data transfer via the one or more DMI pins is disabled, wherein the CRC information is stored in a third portion of the memory associated with the one or more data pins and is retrieved, during the second access operation, using the one or more data pins;

writing, by the memory controller and via a third access operation, updated CRC information to the third portion of the memory using a masked write command using the DMI pins as part of the mode in which data transfer via the one or more DMI pins is disabled; and determining, by the memory system controller and using the block of user data and the CRC information, whether the block of user data includes one or more bit errors.

11. The method of claim 10, wherein the block of user data and the CRC information are associated with a write command received from a host system.

12. The method of claim 10, further comprising: determining, by an on-die ECC component, that the block of user data includes a bit error; and correcting, by the on-die ECC component, the bit error using the on-die ECC information, wherein correcting the bit error using the on-die ECC information by the on-die ECC component is performed prior to retrieving the block of user data by the memory system controller.

13. The method of claim 10, wherein the block of user data includes only 64 bytes of user data, and wherein the CRC information includes only 32 bits of CRC information.

14. The method of claim 10, wherein the first access operation is associated with a first burst length quantity, wherein the second access operation is associated with a second burst length quantity, and wherein the second burst length quantity is less than the first burst length quantity.

15. The method of claim 10, wherein the first access operation is associated with a burst length 32 access operation, and wherein the second access operation is associated with a burst length 16 access operation.

16. The method of claim 10, wherein the block of user data is associated with a reliability, availability, and serviceability (RAS) channel, and wherein the RAS channel is associated with a CRC component that is capable of detecting errors in the block of user data using the block of user data and the CRC information.

17. The method of claim 10, further comprising correcting, using a link ECC operation, one or more bit errors that occurred during a transmission of the block of user data.

18. The method of claim 10, wherein determining whether the block of user data includes the one or more bit errors includes determining, using the block of user data and the CRC information, that the block of user data does include the one or more bit errors, and wherein the method further comprises initiating, by the memory system controller, a redundant array of independent disks error correction operation based on determining that the block of user data does include the one or more bit errors.

19. A compute express link (CXL) compliant memory system, comprising:

one or more components configured to:

retrieve, by a CXL controller and via a first access operation, a user data block (UDB), wherein the UDB is stored in a first portion of a dynamic random access memory (DRAM) associated with one or more DQ pins and is retrievable, during the first access operation, using the one or more DQ pins, and wherein on-die error correction code (ECC) information associated with the UDB is stored in a second portion of the DRAM associated with one or more data mask inversion (DMI) pins;

retrieve, via a second access operation, cyclic redundancy check (CRC) information associated with the UDB as part of a mode in which data transfer via the one or more DMI pins is disabled, wherein the CRC information is stored in a third portion of the DRAM associated with the one or more DQ pins and is retrievable, during the second access operation, using the one or more DQ pins; and write, by the CXL controller and via a third access operation, updated CRC information to the third portion of the DRAM using a masked write command using the DMI pins as part of the mode in which data transfer via the one or more DMI pins is disabled.

20. The CXL compliant memory system of claim 19, wherein the UDB and the CRC information are associated with a write command received from a CXL compliant host system.

21. The CXL compliant memory system of claim 19, wherein the one or more components are further configured to:

determine that the UDB includes a bit error; and correct the bit error using the on-die ECC information prior to retrieving the UDB via the first access operation.

22. The CXL compliant memory system of claim 19, wherein the first access operation is associated with a first burst length quantity, wherein the second access operation is associated with a second burst length quantity, and wherein the second burst length quantity is less than the first burst length quantity.

23. The CXL compliant memory system of claim 19, wherein the UDB is associated with a reliability, availability, and serviceability (RAS) channel, and wherein the RAS channel is associated with a CRC component that is capable of detecting errors in the UDB using the UDB and the CRC information.

24. The CXL compliant memory system of claim 19, wherein the one or more components are further configured to correct, using a link ECC operation, one or more bit errors that occurred during a transmission of the block of user data.

25. The CXL compliant memory system of claim 19, wherein the one or more components are further configured to:

determine, using the UDB and the CRC information, that the UDB includes one or more bit errors; and initiate a redundant array of independent disks error correction operation based on determining that the UDB includes the one or more bit errors.

\* \* \* \* \*